Jan. 25, 1966  W. J. SCHEUTZOW  3,231,222
ROTARY WING AIRCRAFT

Filed May 20, 1964  4 Sheets-Sheet 1

INVENTOR
WILBUR J. SCHEUTZOW
By Watts & Fisher
ATTORNEYS

INVENTOR
WILBUR J. SCHEUTZOW
By Watts & Fisher
ATTORNEYS

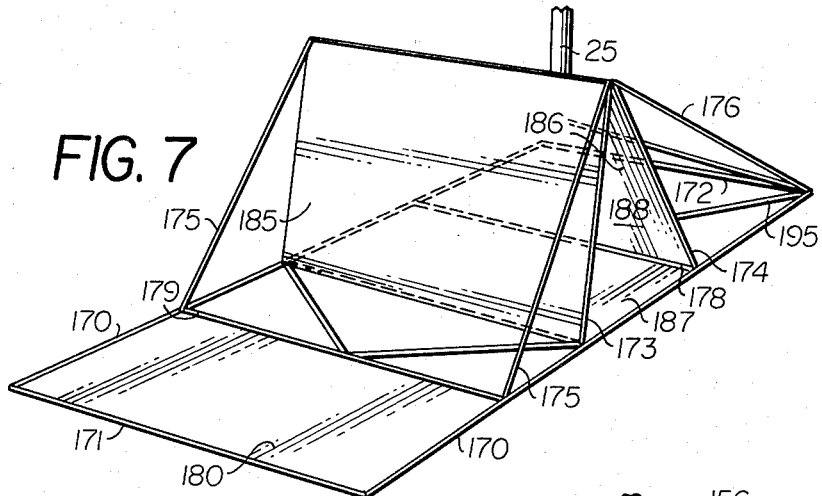
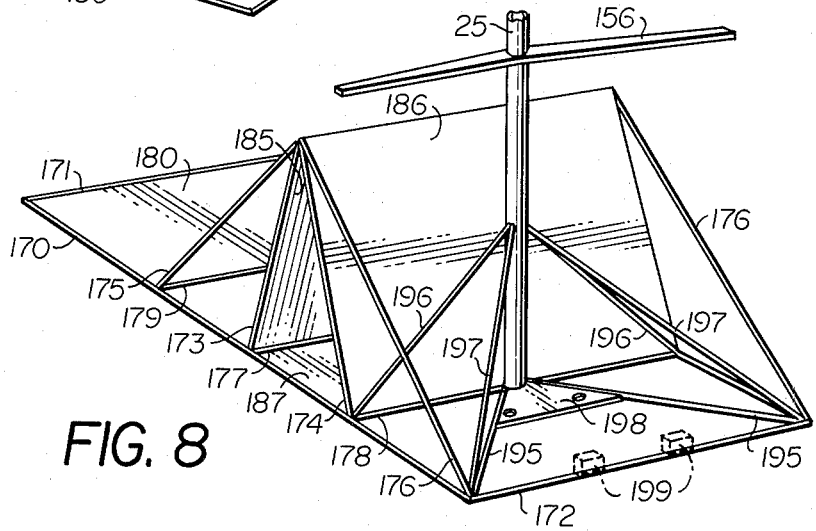
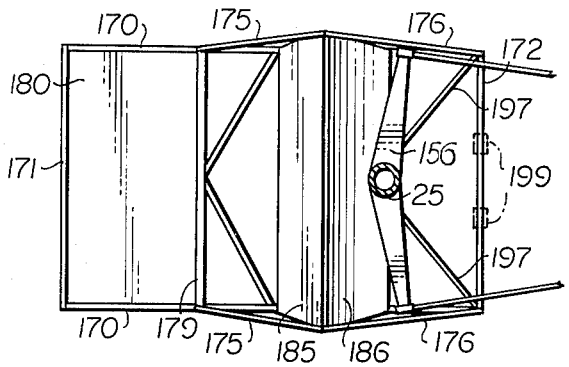

Jan. 25, 1966    W. J. SCHEUTZOW    3,231,222
ROTARY WING AIRCRAFT
Filed May 20, 1964    4 Sheets-Sheet 4

INVENTOR
WILBUR J. SCHEUTZOW
By Watts & Fisher
ATTORNEYS 3,231,222
ROTARY WING AIRCRAFT
Wilbur J. Scheutzow, Berea, Ohio, assignor to Scheutzow
Helicopter Corporation
Filed May 20, 1964, Ser. No. 368,796
25 Claims. (Cl. 244—17.19)

This invention relates generally to rotary wing aircraft of the helicopter type, and more particularly to a greatly simplified, low cost helicopter construction including new and useful improvements in a fully articulated rotor system, an arrangement wherein vibrations of the rotor system are effectively isolated from the body of the craft, and a simplified, articulated, light weight fuselage frame.

Prior helicopters have been constructed with very little variation in the basic concepts of design and arrangement of components. While it is true that improvements are being continually made, substantially all of these efforts to solve recognized problems are within the same framework of conventional design principles. As a result of this common thinking, there has not been a low-cost, simple, and yet fully designed helicopter construction prior to the present invention.

For example, one fundamental problem in rotary wing craft concerns the vibrations set up by the rotor system. In many prior helicopters, the rotor head is supported by a pylon and power is supplied to the head through a gear transmission and a drive shaft extending within the pylon. The transmission is disposed below the pylon and is mounted on the main frame of the craft. The defect of this conventional design is that the pylon, which must be large enough to sustain the structural load of the craft, has a high frequency characteristic, that is, a frequency characteristic approaching the exciting frequency of the rotor system. Hence, unless modulated or attenuated in some manner, the rotor vibrations are transmitted almost undiminished to the body of the craft.

It has been recognized by others that the pylon or mast of the conventional helicopter described above does have a high frequency characteristic and, in an effort to overcome this disadvantage, many complex expedients have been resorted to in the construction of the rotor system. More particularly, a fully articulated, three-bladed rotor has been employed. Usually, a complex damper arrangement has been provided between the blades and the hub in association with the lead-lag hinges. Another expedient resorted to in the classical three-bladed rotor has been to use segmented blades having additional flapping and lead lag hinges outboard of the hinges located at the hub.

In other prior helicopter constructions which have employed two-bladed rotors, the gear box has been rigidly attached to the engine and the drive shaft has extended upwardly through the gear box to support the rotor hub. The controls have been attached externally to the drive shaft, and the entire assembly has been attached to the fuselage by gimbal mountings. This construction has been expensive and difficult to assemble and maintain. When it was required to replace or repair the engine or gear box, the entire assembly of the engine, gear box, drive shaft, controls, and rotor had to be dismantled.

The rotor head and associated pitch control structure is another material factor leading to the complexity and high cost of conventional constructions. Most prior art helicopters and autogyros have been provided with rotor hubs having separately journaled shafts for the flapping hinges and for accomplishing pitch change movement of the blades. In fully articulated arrangements, still other separately journaled shafts are provided for the drag hinges. This has required many anti-friction bearings for mounting each rotor blade, thereby necessitating the assembling and adjustment of many precise parts. Other attendant disadvantages include lubrication problems, fretting of the metal bearing components, and the fact that blade vibrations cannot be effectively isolated using rigid metal bearings in the blade mountings.

Pitch change movement of the blades usually has been accomplished by a swash plate mechanism mounted externally of the rotor shaft. As will be appreciated by those skilled in the art, the external swash plate arrangements are complicated and expensive.

The present invention contemplates several major innovations in the heretofore standardized concepts of helicopter design. The new and useful constructions which are provided simplify and reduce the cost of construction of rotary wing craft, and, at the same time, improve the performance in many aspects. While these innovations have particular utility and cooperation in a new, over-all construction of small, two-place helicopters and the like, it will be apparent from the ensuing description that inidividual features of the new construction also provide unexpected advantages and offer improvements when embodied in conventional craft.

More particularly, the invention contemplates a new and improved, fully articulated rotor head in which metal anti-friction bearings are completely eliminated, thereby eliminating problems of lubrication and fretting. In the preferred construction, the blades are entirely mounted by resiliently flexible bushings which, in addition to the advantages already noted, assist in effectively isolating blade vibrations. The new rotor head construction includes flapping hinges in association with resiliently flexible universal mountings which also permit pitch change movement of the blades and lead-lag motions in the drag plane.

As will thus be apparent, the preferred rotor head contemplated by the invention is simplified due to the elimination of the separately journaled shafts present in prior articulated constructions. Concomitantly, the new construction is less expensive because of the elimination of the precision anti-friction bearings commonly used. Still further, the rotor head of this invention is of light weight by reason of its simplified construction.

The invention also provides a new and improved rotor head construction which includes tension links arranged to sustain the centrifugal forces deriving from the blades. These tension links are particularly advantageous in the preferred embodiment, since the tension loads are not transmitted to the resiliently flexible bushings which mount the blades. Consequently, the bushings can be inexpensively formed as distinguished, for example, from laminated rubber and metal bushings which have been suggested by others in the art. Still further, the unloading of the universal pivots simplifies the construction of the rotor head and provides for ease of control.

The preferred rotor system controls essentially comprise a simple T-control device instead of the conventional, complicated and expensive swash plate mechanism. The stem of the T-control device extends upwardly through the rotor hub and its outwardly extending arms are provided with terminal masses so as to form a gyroscopic stabilizer bar. The bottom end of the T-control is connected through a suitable linkage mechanism to the control stick in the pilot's compartment for effecting cyclic pitch control. Cyclic pitch change movement of the rotor blades is brought about through drop links connected between the arms of the T-control device and the flexibly mounted flapping hinges. Collective pitch change movement of the blades is affected by a linkage connected to a non-rotatable socket which is bearinged within the rotor hub as an operative part of the T-control device.

In accordance with the preferred embodiment of this invention, the rotor head and controls are carried by a fixed mast which acts as a spring member. The rotor drive is mounted closely adjacent the rotor head. In the preferred embodiment, the drive comprises a flexible belt transmission which is also carried by the mast. As will hereinafter be explained in more detail, the size of the mast can be made to carry the required structural loads without obtaining a high frequency characteristic by reason of the fact that the mast supports the combined masses of the rotor head, the rotor drive, and controls. Thus, the new construction provided by this invention is characterized by effective isolation of the vibrations of the rotor system from the body of the craft.

Further, since the mast exhibits an unusually low frequency characteristic in cycles per minute relative to the impressed frequency of the rotor system and thereby attenuates the vibrations of the rotor system, the invention makes it possible simply and economically to secure the mast directly to the main frame of the fuselage. The preferred mast securing structure contemplated by this invention essentially comprises bracing provided between the longerons and an intermediate portion of the mast. This bracing also defines a transversely extending, triangular box frame structure which, together with associated panels, carries torsional loads and advantageously forms a baggage compartment.

Another feature of the invention is an articulated fuselage construction in which the tail boom is free to move relatively to the forward portion of the fuselage instead of being rigidly anchored as in many conventional constructions. To this end, the tail boom is pivotally secured to the mast and is supported by members which are pivotally connected to the boom and to the forward portion of the fuselage. Since the mast is a spring member and since the tail boom is able to move because of the pivot connections, the vibrations of the tail rotor and its mechanical drive components are effectively isolated from the pilot's compartment.

Other features and advantages of the invention will become apparent from the following detailed description and the accompanying drawings.

In the drawings:

FIGURE 7 is a schematic, perspective elevational view of the preferred frame and mast securing structure provided by this invention;

FIGURE 8 is another perspective view of the preferred frame and mast securing structure;

FIGURE 9 is a top plan view of the structure shown in FIGS. 7 and 8;

Figure 1:
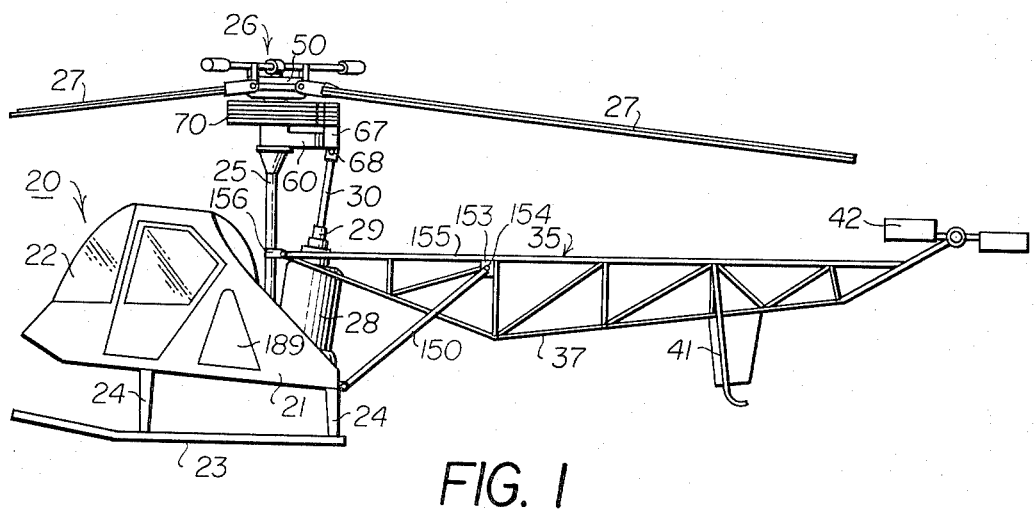
FIGURE 1 is a side elevational view of a preferred helicopter construction embodying the present invention.
Figure 2:
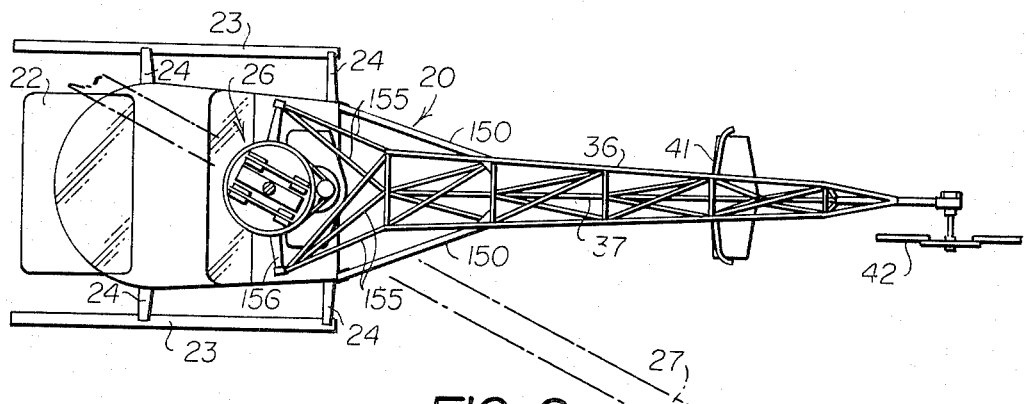
FIGURE 2 is a top plan view of the helicopter construction shown in FIG. 1.

Referring now to the drawings, and to FIGS. 1 and 2 in particular, the helicopter embodying the present invention is indicated generally by reference numeral 20. As shown, the helicopter 20 includes a fuselage 21 having an enclosed pilot's compartment 22 in the forward portion. The illustrated landing gear for the helicopter 20 comprises skids 23 in the form of steel tubes or the like which are connected to the fuselage 21 by outwardly curved, spring metal struts 24. The struts 24 may be formed of spring aluminum extrusion stock or the like, and thereby provide for a simple, inexpensive landing gear assembly.

A fixed mast 25 is secured to the fuselage 21 aft of the pilot's compartment 22. In accordance with this invention, the fixed mast 25 carries a preferred rotor head 26 together with controllable pitch blades 27 which are connected thereto. The construction of the rotor head 26, which includes the rotor drive and controls for the helicopter 20, and the connections of the blades 27 to the head form an important part of the invention and will be hereinafter discussed in detail. The power plant of the helicopter 20 comprises an engine 28 which is mounted centrally of the fuselage 21 adjacent the mast 25. The engine is connected through suitable clutch mechanisms (not shown) and a universal connection 29 to the drive shaft 30.

The fuselage 21 of the helicopter 20 also includes a tail boom 35. As shown in FIGS. 1 and 2, the boom 35 is comprised of a conventional truss including upper longerons 36 and a lower longeron 37. The tail boom 35 carries a stabilizer 41 and a tail rotor 42. The tail rotor 42 is connected by a suitable drive and control mechanism (not shown) to the engine 28 and to the pilot's compartment 22. As will be described in detail, the boom 35 is connected to the forward portion of the fuselage and to the mast 25 to provide articulation and to isolate vibrations of the tail rotor and mechanical drive components.

Figure 3:
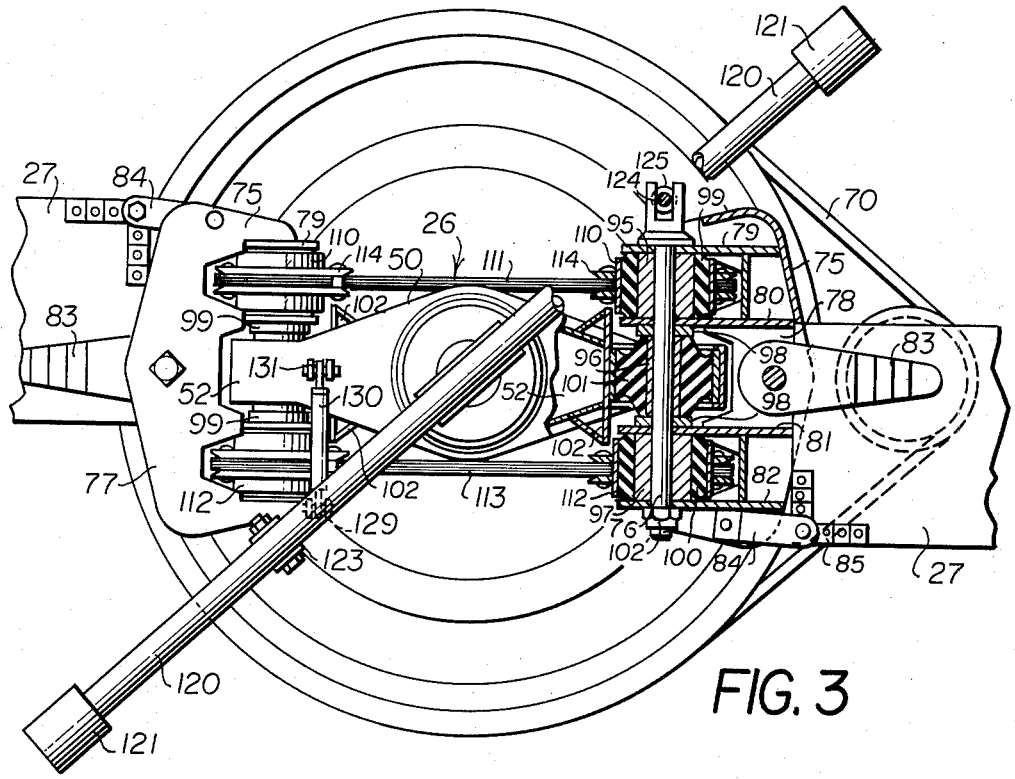
FIGURE 3 is an enlarged, top plan view with portions in cross-section of the new and preferred rotor head provided by this invention.
Figure 4:
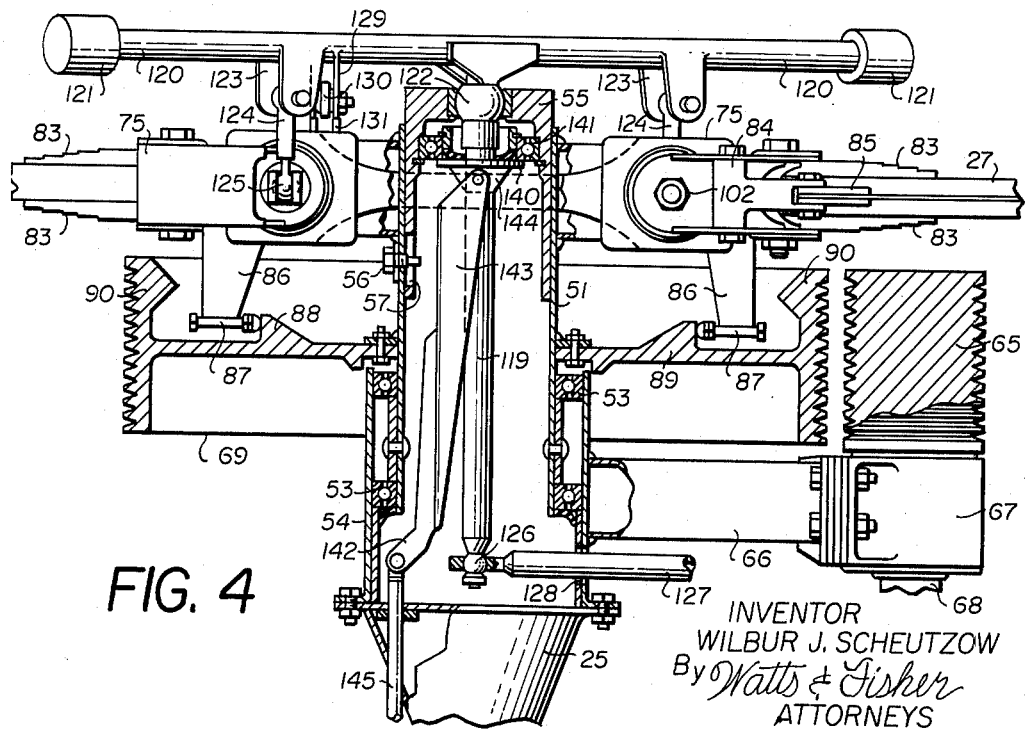
FIGURE 4 is a vertical cross-sectional view of the rotor head construction shown in FIG. 3.

Referring now to FIGS. 3 and 4, the preferred rotor head construction 26 of the invention is shown in greater detail as comprising a rotor hub 50. The hub 50 includes a hollow shaft 51 having hub extensions 52. The lower end of the shaft 51 is rotatably supported by bearings 53 within a housing 54. The housing 54 is secured to an enlarged upper end of the fixed mast 25. The hub 50 also includes a vertically reciprocal control sleeve 55 which is carried within the shaft 51. A key 56 is mounted on the shaft 51 and extends within a vertical slot 57 formed in a side wall of the control sleeve 55. With this construction, the shaft 51 and the sleeve 55 rotate together, and the sleeve 55 is vertically adjustable to produce collective pitch control in a manner hereinafter described.

In the preferred embodiment of this invention, the weight of the rotor head drive is carried by the mast 25. Referring particularly to FIG. 4, the preferred rotor head drive is shown to comprise a drive sheave 65 which is supported by a beam 66. The beam 66 extends from the housing 54 and carries a bearing housing 67. The drive sheave 65 is connected through the bearing housing 67 and a universal connection 68 to the motor drive shaft 30. A driven sheave 69 is fixed to the rotor shaft 51 and is operatively connected to the drive sheave by V-belts 70 (FIG. 3).

As generally described above, the blades 27 are fully articulated and are entirely mounted by resiliently flexible means so that fretting, such as occurs with conventional metal bearings, is eliminated. The novel construction affording these advantages comprises blade mounting brackets 75 which carry shafts 76 that establish the flapping axes. The illustrated blade mounting bracket construction includes an upper plate 77, a lower plate 78 and transverse plates 79–82. The root ends of the blades are connected to the mounting brackets 75 by cheek plates 83 and by trailing edge attachment members 84. The heads of the members 84 are mounted between the bracket plates 77 and 78. The stems of the members 84 are bifurcated and are adjustably fastened to plates 85 on the trailing edges of the blades.

Stop arms 86 extend downwardly from the blade mounting brackets 75. The stop arms 86 carry abutment members 87. As shown in FIG. 4, the abutment members 87 are engageable against an annular droop stop 88 when the rotor is in static condition. The annular droop stop 88 is formed on a web 89 which is an integral part of the driven sheave 69. An upper flapping stop 90 also is provided within the driven sheave 69.

As most clearly shown in FIG. 3, the flapping axis shafts 76 extend through the spaced transverse walls 79–82 of the brackets 75. Each bracket and shaft assembly includes a spacer sleeve 95 between the walls 79 and 80, a centrally disposed sleeve 96 between the walls 80 and 81 and another spacer sleve 97 between the walls 81 and 82. Additional spacers 98 may be provided between the ends of the centrally disposed sleeve 96 and the walls 80 and 81. The sleeves 95 and 97 are respectively constrained in torsionally resilient flexible bushings 99 and 100 which are formed of rubber or the like. The sleeve 96 is resiliently flexibly mounted in a bushing 101 which also is formed of rubber or the like. The flapping axis shaft 76 projects through the stacked sleeves 95, 96 and 97, and the entire assembly is secured by a nut 102 which is threaded on an end of the shaft and torqued against the bracket wall 82.

Flapping motion of the blades 27 is afforded through torsional deformation of the resiliently flexible bushings 99, 100 and 101. The central rubber bushings 101, which are carried by the rotor hub extensions 52, also advantageously serve as resiliently flexible universal mountings for the flapping axis shafts which permit lead-lag and pitch change movements. Thus, due to the flexibility of the bushings 101, the blades 27 have freedom of lead-lag motion, whereby each shaft 76 effectively pivots about a vertical axis which is approximately midway between its ends and lies in a plane parallel to the axis of rotor rotation. Suitable stops 102 are provided on the hub extensions 52 for contacting portions of the bracket assemblies 75 in periods of maximum torque differential between the rotor hub and the blades normally experienced during starting and stopping operations. Rotation of each flapping axis shaft 76 in pitch change movement takes place about a horizontal axis passing approximately through the centers of the flexible bushings 101.

Each of the rotor bushings 99 is disposed in a retaining housing 110. In the illustrated two-blade embodiment of the invention, the housings 110 are connected by a tension link 111. The bushings 100 are similarly disposed in restraining housings 112 and are connected by a tension link 113. The tension links 111 and 113 are flexible members formed of thin steel strips or the like which will twist to accommodate collective pitch change. The tension links also deform during lead-lag motions of the blades and to allow this deformation the links 111 and 113 are connected to the housings 110 and 112, respectively, by members 114 which include bell-mouths, as viewed in FIG. 3. It will be observed that twisting of the tension links is not required during cyclic pitch change, thereby avoiding fatigue of the steel strips during such blade movement.

In the two-bladed embodiment shown in the drawings, the major tension loads deriving from centrifugal forces on the blades are not introduced into the rotor hub because one blade provides a reaction force that is transmitted through the interconnecting tension links to the other blade. However, in alternative constructions as hereinafter described in detail, the tension links on the blade mounting brackets may be directly connected to the rotor hub or to another part of the rotor head, as for example, in a three-bladed embodiment, instead of to another blade. All of these constructions are characterized by the fact that the tension loads are not imposed on the universal blade mounting pivots. As generally discussed above, this arrangement is advantageous because of the simplicity in design and because inexpensive rubber bushings can be employed to mount the blades. The use of such bushings is permissible, since they are not required to sustain the tension loads. For the same reason, the rotor system can be easily controlled.

The control structure for obtaining desired cyclic and collective pitch change of the blades 27 comprises another important feature of the invention. Referring particularly to FIG. 4, a T-control structure comprising a cyclic pitch control rod 119 having outwardly extending arms 120 is provided. As shown, the arms 120 may be provided with terminal masses 121 to form a gyroscopic stabilizer bar. The control rod 119 extends within the rotor shaft 51 through the vertically reciprocal control sleeve 55. The control rod 119 is mounted through the upper end of the sleeve 55 by a ball and socket joint 122 which allows control positioning of the rod. By mounting the T-control device in this manner, control positioning of the lower end of the rod 119 causes the arms 120 to rotate in an inclined plane performing the function of a swash plate mechanism, thereby providing cyclic pitch control to the blades.

The arms 120 of the T-control device are provided with yokes 123 which carry pivotally attached drop links 124. The drop links 124 may be in the form of turnbuckles which are connected by ball and socket joints 125 to the leading sides of the blade mounting brackets 75. The lower end of the control rod 119 is connected by a ball joint 126 to a cyclic pitch control arm 127. The cyclic pitch control arm 127 extends through an enlarged hole 128 in the side wall of the housing 54 and is suitably connected by means (not shown) to the control stick in the pilot's compartment. One of the arms 120 is provided with another yoke 129 which is connected by a pivot connecting link 130 to a yoke 131 on the rotor hub 50. The link 130 maintains the arms 120 of the T-control device in proper angular relation with respect to the rotor hub.

A collar 140 is mounted on the upper end of the vertically reciprocal sleeve 55 by bearings 141. The collar 140 is reciprocal with the sleeve 55 but does not rotate. A collective pitch control link 142 is provided in the rotor shaft 51 for vertically actuating the assembly of the control sleeve 55 and the collar 140. The collective pitch control link 142 is in the form of a yoke having forked legs 143 which are pivotally attached to depending ears 144 of the collar 140. The opposite end of the collective pitch link 142 is attached to a collective pitch push-pull control rod 145. The push-pull control rod 145 is connected by suitable means (not shown) to the collective pitch control lever in the pilot's compartment.

In summary of the operation and the construction of the rotor head described above, rotation of the blades 27 is obtained by rotation of the drive shaft 30 and the flexible drive comprising the drive sheave 65, the driven sheave 69 and the connecting V-belts 70. While the illustrated flexible V-belt drive offers many advantages in the way of a compact and inexpensive construction, it should be noted at this point that a gear transmission could be employed without detracting from other features of the invention. The flapping axis shafts 76 are entirely mounted by resiliently flexible bushings, and this novel flexural mounting construction is characterized by the absence of any bearings. Thus, flapping movement of the blades is obtained due to the torsional resilience of the bushings 99, 100 and 101. The flexible universal mountings provided by the center bushings 101 afford lead-lag motions of the blades which are effectively connected in the drag plane by the tension links 111 and 113, and also permits blade movement about the pitch axis of the blade.

Cyclic pitch change of the blades 27 is obtained by positioning the cyclic pitch control arm 127 which causes rotation of the T-control arms 120 in a selected inclined plane, thereby providing cyclic actuation of the blades through the drop links 124. Since the drop links 124 are raised and lowered in opposition during cyclic pitch control, twisting of the tension links 111 and 113 does not occur.

Collective pitch change is obtained by vertical actuation of the push-pull control rod 145 and the link 142 which raises or lowers the control sleeve 55 in association with the T-control structure 119 and 120. The resilient mountings provided by the bushings 99, 100 and 101 permit twisting of the shafts 76 in opposite directions and, as noted above, the tension links 111 and 113 also twist to accommodate this movement.

The location of the power transmission adjacent the rotor hub makes it possible to provide a simple and inexpensive T-control device for pitch change of the blades. The advantages of the novel T-control device comprising members 119 and 120 over the conventionally employed complicated and expensive swash plate structures will be readily apparent to those skilled in the art. The location of the power transmission adjacent the rotor hub also makes it possible to support the entire mass of the rotor head, rotor control and rotor drive at the top of the mast 25. Due to the mass of the components at the top of the mast, the arrangement attains the above-stated advantage of a mast having a low frequency characteristic, i.e., a frequency characteristic in cycles per minute which is less than the operating r.p.m. of the rotor, whereby rotor vibration is effectively isolated from the helicopter fuselage. As previously discussed, many conventional constructions are such that the weight of the rotor drive, typically a gear reduction unit of the planetary gear type, is supported directly by the helicopter body. Therefore, when the shaft carrying the rotor head is of the size necessary to support the structural load of the craft, the shaft exhibits a high frequency characteristic, that is, a frequency characteristic approaching the exciting frequency of the rotor system. Hence, the high frequency vibrations induced in the shaft by the rotor system are transmitted substantially undiminished to the helicopter body. In the present invention, however, the size of the mast 25 is made sufficient to carry the structural load of the craft without obtaining a high frequency characteristic because of the mass supported at the top of the mast. By way of example, when the rotor system of the illustrated two bladed embodiment is operating at 500 revolutions per minute, there is an exciting frequency of 1000 cycles per minute. The mast 25 acts as a spring member and, in accordance with this invention, may have a frequency characteristic of only one-fifth of the exciting frequency or 200 cycles per minute which is less than the operating r.p.m. of the rotor. This exemplary construction provides attentuation of the exciting vibratory force to approximately 4%.

It will be evident that the rubber bushings in the rotor head 26 further isolate blade vibrations from the mast and the rest of the structure. This construction affords an additional advantage in embodiments employing conventional gear transmissions in place of the illustrated flexible drive, since the resilient universal pivot isolates periodic blade vibrations in the plane of rotation from the transmission gears, thereby materially extending gear life.

Figure 5:
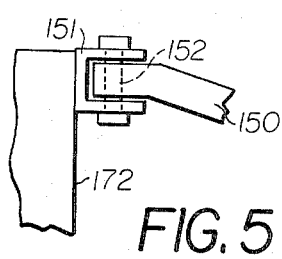
FIGURE 5 is a fragmentary view of a portion of the fuselage.
Figure 6:
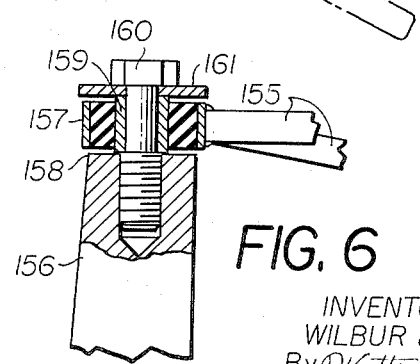
FIGURE 6 is another fragmentary view, partially in cross-section, of the fuselage.

Referring again to FIGS. 1 and 2, and also to FIGS. 5 and 6, the forward end of the tail boom 35 is shown to be connected to the mast 25 instead of directly to the passenger compartment as is commonly done. In the illustrated construction, structural members 155 form a continuation of the tail boom truss. These structural members are pivotally connected to the ends of a boom attachment arm 156 which is carried by the mast 25, whereby the mast is free to move relative to the tail boom. The ends of the structural members 155 at each end of the arm 156 may be secured to a collar 157 in which is constrained a rubber bushing 158 and an inner sleeve 159. The flexible connecting assemblies consisting of the members 157, 158 and 159 are fastened to the ends of the mast arm 156 by bolts 160 and washers 161.

The tail boom 35 is supported by struts 150. The struts 150 are pivotally attached to opposite sides of the fuselage by brackets 151 and by cooperating pins 152. The opposite ends of the struts are similarly connected to the tail boom truss by brackets 153 and pins 154.

It will be apparent from the foregoing that the tail boom 35 is connected to the forward portion of the fuselage 21 through the mast 25 and the struts 150. Since the mast 25 acts as a spring member and since the struts 150 are pin connected to the fuselage and to the tail boom, an articulated frame construction is provided which serves to isolate vibrations of the tail rotor and its mechanical drive components from the pilot's compartment.

The effective isolation of the rotor vibration from the helicopter 20 makes it possible to provide a simply designed fuselage frame structure for securing the mast 25. Referring to FIGS. 7, 8 and 9, the preferred fuselage frame structure contemplated by this invention is shown to include longerons 170 which are connected at their forward and aft ends by transverse beams 171 and 172, respectively. A triangular framework formed by members 173 and 174 extends upwardly from each longeron and is supported by beams 175 and 176. The bottom ends of the framework beams 173 and 174 are respectively connected by transverse beams 177 and 178. An additional transverse beam 179 is provided forward of the beam 177 and cooperates with the longerons and the beam 171 to support the floor panel 180 of the fuselage.

In the preferred construction, the triangular framework members 173 and 174 respectively support bulkhead panels 185 and 186. The bulkhead panels 185 and 186 cooperate with a bottom panel 187 to form a triangular box structure which effectively carries torsional loads. The triangular box structure formed by the members 185, 186 and 187 also defines a luggage compartment 188 which is forward of the mast 25. Removable luggage compartment doors 189 (FIG. 1) may be provided at each side of the frame.

The mast 25 is secured aft of the bulkhead plate 186 by the transverse beams 178 and by beams 195 which extend forwardly from the ends of the longerons 170 to the bottom of the mast. Additional supporting members in the form of struts 196 and 197 extend upwardly from the spaced locations along each longeron to the mast. The engine 28 may be connected to the frame by a mounting plate 198 which is disposed between the members 195 at the connection to the mast 25 and by engine mounting blocks 199 of rubber or the like on the tranverse beam 172. The rubber mounting blocks 199 and similar resilient mountings (not shown) on the plate 198 serve to isolate engine vibrations from the frame.

Thus constructed, the frame is of simple design and yet provides an effective means for securing the fixed mast 25. As noted above, this simple mast securing structure is made possible by locating the weight of the drive transmission and rotor controls on top of the mast 25, and by effective isolation of rotor vibration from the body of the craft. Still another advantage of the preferred frame and mast securing structure is that it is characterized by a high load-weight ratio.

Figures 10, 11, 12:
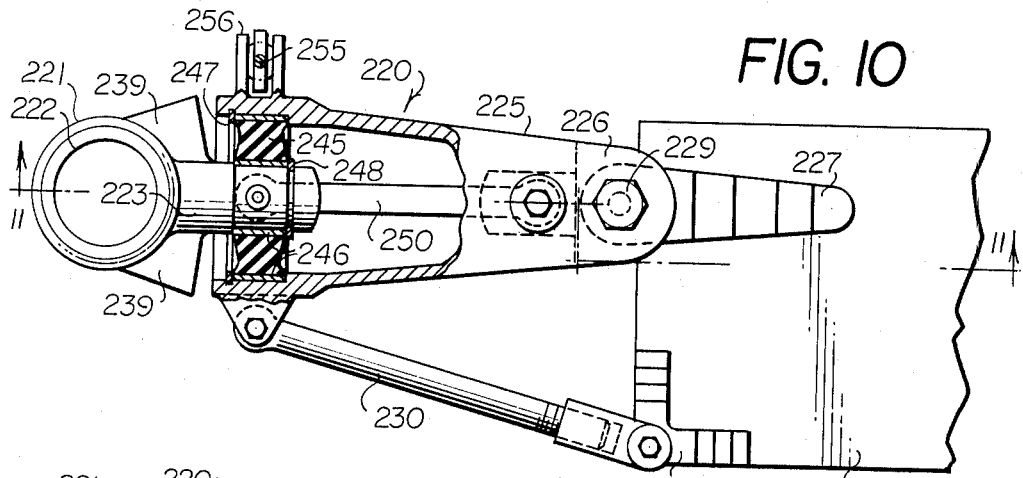
FIGURE 10 is a fragmentary plan view partially in cross-section of another embodiment of the new rotor head provided by this invention.
FIGURE 11 is a cross-sectional view taken on the line 11—11 of FIG. 10.
FIGURE 12 is a fragmentary, cross-sectional view of still another embodiment of the rotor head.

Reference is now made to FIGS. 10 and 11 which illustrate a modified rotor head construction 220 that is suitable for three- and four-bladed rotor embodiments as well as two-bladed embodiments. The construction 220 comprises a hub 221 which may be mounted in the same manner as previously described in conjunction with FIGS. 3 and 4. The hub 221 includes a hollow shaft 222 which may have two or more hub extensions 223 (only one of which is shown) for mounting a corresponding number of blades 224.

As in the embodiment of FIGS. 3 and 4, each of the blades 224 is fully articulated and is mounted by resiliently flexible means. The modified blade mounting construction comprises a hollow bracket member 225 which has extending ears 226. The root end of the blade 224 is provided with cheek plates 227 and is secured between the ears 226 by a shaft 228 and cooperating nuts 229 threaded on the ends of the shaft. An adjustable strut 230 is connected to the end of the bracket member 225 adjacent the hub 221 and to a plate 231 on the trailing edge of the blade.

As shown, the bracket member 225 includes a droop stop 236 which cooperates with a flange 237 on the hub shaft 222, and a flapping stop 238 which is engageable with the hub shaft. Lead-lag stops 239 are provided on either side of the hub extension 223 and are engageable by the bracket member 225.

The bracket member 225 is mounted on the hub extension 223 by a resiliently flexible bushing 245 which forms a universal pivot. The bushing 245 is mounted between metal rings 246, and the assembly of the bushing and rings is held within the bracket member by a snap ring 247. Another snap ring 248 is provided to hold the bushing and ring assembly on the hub extension.

The centrifugal force deriving from the blade 224 is sustained by a tension link 250. The tension link 250 is preferably a laminated, flexible member formed of thin metal strips or the like. As shown most clearly in FIG. 11, the tension link 250 extends within the hollow bracket member 225 and is secured to the bracket member adjacent the root end of the blade by a pin 251. The opposite end of the tension link extends within the bell mouth end 252 of the hub extension 223 and is secured by a pin 253.

The control structure (not shown) may be substantially the same as that described above in conjunction with FIGS. 3 and 4, except that the control device corresponding to member 119, 120 is provided with two or more outwardly extending arms to correspond with the number of blades. The drop link 255 on each arm may be connected to the leading edge of a bracket member 225 by a ball and socket joint 256. As will be apparent from the foregoing description, pitch change movement of the blade 224 is obtained through the torsional resilience of the bushing 245. Similarly, the resiliently flexible bushing permits flapping and lead-lag motions of the blade.

In FIG. 12 there is shown a modified universal pivot construction which may be substituted for the central resilient bushings 101 disclosed in the embodiment of FIGS. 3 and 4. As will be apparent from the following description, this modified pivot construction is such that the resiliently flexible material is primarily subjected to compression loads, thereby permitting the pivot to be utilized in large helicopters, such as in helicopters having a 3000 to 4000 or greater horsepower capacity.

Referring to FIG. 12, elements of the disclosed construction which correspond to like elements of the construction of FIGS. 3 and 4 are indicated by the same reference numerals. The modified structure comprises two rigid hemispherical members 270 and 271 which are disposed between the walls 80 and 81 of the bracket 75. These hemispheres 270 and 271 are fixedly mounted with their flat faces against opposite surfaces of a web 273. The web 273 is part of a member 274 which is secured within the hub extension 52.

Generally cup-shaped shells 280 and 281 are provided adjacent the outer surfaces of the hemispheres 270 and 271, respectively, and these shells fixedly carry disks 282. The shells 280 and 281 and the disks 282 are mounted for universal movement on the hemispheres by means of flexible bushings 283 which are compressed between the insides of the shells and the other surfaces of the hemispheres. The assembly consisting of the hemispheres 270 and 271, the member 274, the shells 280 and 281, and the bushings 283 is formed with an axial passage 285 having outwardly flared end portions 286. As shown, the center spacer sleeve 96 is positioned within the passage 285 and extends between the disks 282.

Taking FIGS. 3 and 12 in conjunction, it will be understood that the blade mounting bracket 75 is secured to the disks 282 by means of the shaft 76 which projects through the center sleeve 96 and the walls of the bracket and by the cooperating nut 102. The sleeve 96 maintains the disks 282 in predetermined spaced apart relation so that the nut 102 can be torqued against the outer bracket wall 82 without overloading the flexible bushings 283. It will also be understood that the connection of the links 111 and 113 and the flight control structure to the modified pivot mounting of FIG. 12 may be the same as illustrated in FIG. 3.

Thus, flapping motion of the blade will take place about the longitudinal axis of the shaft 76, and during such motion the shells 280 and 281 will move on the hemispheres 270 and 271 due to the flexibility of the interposed bushings 283. Similarly, the blade has freedom of leadlag motion, whereby movement of the shells permits the shaft 76 to pivot about an axis passing between its ends and lying in a plane parallel to the axis of rotor rotation. Rotation of the shaft 76 occurs about a horizontal axis transverse to the shaft.

In each of the above-described embodiments of the rotor head of this invention, the blades are fully articulated in the flapping and drag planes and have freedom of pitch change movement. At the same time, there is provided flexible tension links which carry the centrifugal forces deriving from the blades. To this end, the links are connected to the blades and to another part of the rotor separate from the pivot mountings for the connected blades, as, for example, to an opposite blade or to the hub. As pointed out above, this relieves the tension loads from the universal pivot mountings and thereby makes it possible to employ inexpensive rubber bushings.

Further, the tension link or links connected to each blade are arranged so as to establish a balanced line of reactive force passing through the universal pivot mountings, whereby the blades have freedom of movement in the drag plane. This advantage is obtained in the embodiments of FIGS. 3 and 12 by locating the universal pivot mountings equidistant between the links that are connected to each blade. In the embodiment of FIGS. 10 and 11, the same advantage is obtained by a single link which is connected to each blade and to the hub extension which mounts that blade and on which the universal pivot constrcution is located.

Many other modifications and variations of the invention will be apparent to those skilled in the light of the foregoing disclosure. Therefore, it is to be understood that, within the scope of the appended claims, the invention can be practiced otherwise than as specifically shown and described.

What is claimed is:

1. A helicopter comprising in combination a fuselage, a mast constructed as an upstanding spring shaft connected to said fuselage, said mast being fixed against rotation and having an elongated cantilever portion extending above said fuselage, a sustaining rotor carried by said mast portion, a drive transmission supported by said mast portion near its upper end, said transmission being in proximity to said rotor, means connecting said transmission to said rotor, an engine mounted on said fuselage below said rotor, drive means connecting said engine to said transmission, and the length of said mast portion and the weight of said transmission and said rotor being such that the assembly of said mast and supported transmission and rotor has a low frequency characteristic in cycles per minute which is less than the operating revolutions per minute of the rotor so that vibrations of the rotor system are effectively isolated from said fuselage.

2. The helicopter as claimed in claim 1 wherein said fuselage includes a forward portion, a tail boom, means pivotally connecting said tail boom to said mast for permitting movement of said mast relative to said boom, and boom supporting means pivotally connected to said boom and to said forward portion of said fuselage.

3. The helicopter as claimed in claim 1 wherein said drive transmission comprises a drive sheave, means connecting said drive sheave to the upper end portion of said mast, a driven sheave connected to said rotor, and flexible belt means connected between said drive sheave and said driven sheave.

4. The helicopter as claimed in claim 1 wherein said rotor comprises a hub rotatable on a central axis, at least two sustaining blades, and means mounting said blades on said hub, said blade mounting means including means forming a flexural universal pivot connection between each blade and a portion of said hub off-set from said central axis.

5. The helicopter as claimed in claim 4 wherein said means forming said flexural pivot connections comprises a member on the root end of each blade, and resiliently flexible bushing structure mounted between said members and said hub, said bushing structure being secured against sliding movement relative to said members and said hub and being deformable to permit blade articulation, and wherein said rotor includes axially non-extensible link means connected between each of said members and another portion of said rotor so as to sustain the centrifugal forces deriving from said blades.

6. The helicopter as claimed in claim 5 including rotor control means carried at the upper end of said mast, said control means including a control device having a stem extending upwardly through said hub and outwardly extending arms on said stem, means connecting said arms to leading portions of said blade mounting means, means mounting said device for vertical reciprocation in said hub to cause collective pitch change movement of said blades, means mounting said stem in said hub for angular pitch control adjustment to cause cyclic pitch change movement of said blades, and means maintaining said arms in predetermined angular relation with respect to said hub.

7. A fuselage construction for a helicopter or the like comprising a forward frame portion, an upstanding mast constructed as a cantilever spring shaft secured to said frame portion, a tail boom, means connecting said boom to said mast, said connecting means including pivot means for permitting movement of said mast relative to said boom, and support members pivotally connected to said boom and to said frame portion.

8. The construction as claimed in claim 7 including a frame structure traversing said forward frame portion, said mast being secured to said forward frame portion aft of said frame structure, and said frame structure defining a storage compartment.

9. A fuselage construction for a helicopter or the like comprising longerons, transversely extending members connected between said longerons, a side frame extending upwardly from each longeron, transverse bulkhead panels supported by said frames, a bottom panel connected between said longerons and lying between said bulkhead panels, said panels cooperating to define a triangular box structure, an upstanding mast aft of said box structure, and bracing means connecting said mast to said longerons.

10. A rotor for helicopters and the like comprising in combination:
(a) a hub rotatable about a central axis,
(b) said hub having a plurality of extensions;
(c) a plurality of sustaining blades;
(d) structure connecting each blade to a different hub extension at a location laterally off-set from said hub axis;
(e) said connecting structure for each blade including:
  (i) a member attached to the root end of the blade,
  (ii) means forming a pivot mounting between said member and the hub extension,
  (iii) said pivot forming means providing a pivot axis extending in a plane generally parallel to the plane of said hub axis and transverse to the plane of rotor rotation so that the blade has freedom of lead-lag motion;
(f) a pair of axially non-extensible flexible tension links associated with each blade;
(g) said links having corresponding ends operatively connected to the root end of the associated blade and opposite ends connected to another part of the rotor separate from the pivot mounting of the blade so as to sustain the centrifugal forces deriving from the blade;
(h) said pivot mountings for said blades being disposed substantially equidistant between said corresponding ends of said links so as to establish lines of reaction force passing through said pivot mountings; and,
(i) said links being sufficiently flexible under forces imposed transversely to their lengths to permit lead-lag motion of said blades.

11. The rotor as claimed in claim 10 wherein said pivot mounting for each blade comprises a resiliently flexible bushing engaged between a hub extension and the member connected to the blade, said bushing being secured against movement relative to the hub extension and the member, and said bushing being sufficiently flexible to provide universal blade articulation through deformation of said bushing.

12. The rotor as claimed in claim 10 including flight control means operatively connected to said blades, said flight control means comprising a control structure extending through said hub and rotatable therewith, means mounting said control structure in said hub for reciprocation and angular movement with respect to the axis of said hub, means connecting said control structure to leading edge portions of said blade mounting structure so that collective and cyclic pitch change movement of said blades can be respectively obtained by reciprocal and angular control movements of said control structure, and means maintaining said control structure in predetermined angular relation with respect to the plane of rotation of said blades.

13. In a rotor for helicopters and the like including a hub rotatable about an axis and a plurality of sustaining blades, a flexural blade-to-hub connection providing flapping, lead-lag and pitch change blade articulation, said connection for each blade comprising in combination:
(a) first and second bushing mounting means,
(b) said mounting means being relatively rotatable,
(c) one of said mounting means being disposed within and spaced from the other of said mounting means;
(d) deformable, resiliently flexible material disposed between said mounting means,
(e) said material being secured against sliding movement relative to the confining surfaces of said mounting means so that movement of said one mounting means relative to said other mounting means is accommodated through deformation of said material;
(f) structure connecting said first mounting means to the root end of said blade so that lift and torque forces imposed on said blade are transmitted to said flexible material; and,
(g) said second mounting means being connected to said hub at a location laterally off-set from said hub axis.

14. The combination as claimed in claim 13 wherein said one mounting means comprises structure defining a generally spherical surface, and wherein said other mounting means comprises structure defining cup-shaped surfaces conforming to said spherical surface, said material being secured between said surfaces against relative sliding movement.

15. The combination as claimed in claim 13 wherein said first mounting means comprises a hollow bracket having an open end oriented toward said hub, wherein said second mounting means includes a hub extension extending into said open end of said bracket, and wherein said material is in the form of an annulus secured in said bracket around said hub extension.

16. The combination as claimed in claim 13 wherein said one mounting means comprises a shaft, said deformable, resiliently flexible material being disposed around said shaft between its ends.

17. The combination as claimed in claim 16 including a torsionally deformable, resiliently flexible annular member surrounding each end portion of said shaft, a housing around each annular member, and a pair of flexible tension links, said links having corresponding end portions connected to a different one of said housings and opposite end portions connected to another part of said rotor so as to sustain the centrifugal forces deriving from said blades.

18. A rotor for helicopters and the like comprising in combination:
(a) a hub rotatable about a central axis;
(b) said hub having oppositely projecting, lateral extensions;
(c) a pair of sustaining blades;
(d) a bracket connected to the root end of each blade;
(e) a shaft carried by each bracket and extending laterally of the associated blade;
(f) an annular, torsionally deformable, resiliently flexible bushing carried by each of said hub extensions at a location off-set from said central axis;
(g) said shafts projecting through said bushings;
(h) said bushings being secured against sliding movement relative to said shafts and said hub extensions;
(i) said bushings being deformable to permit each shaft to pivot about a lead-lag axis extending transversely of the shaft in a plane parallel to said central axis, and to rotate about a pitch change axis passing approximately through the center of each bushing and about a flapping axis coinciding with the longitudinal axis of the shaft,
(j) pitch control means carried by said hub and connected to said blades for producing cyclic and collective pitch change movement;
(k) an axially non-extensible, flexible tension link disposed on each side of said hub and connecting corresponding ends of said shafts for sustaining the centrifugal forces deriving from said blades; and,
(l) rings of torsionally deformable, resiliently flexible material connecting the ends of said links and to the ends of said shafts;
(m) said rings being sufficiently flexible to accommodate movement of said shafts in opposite directions about said pitch axis during collective pitch change movement of said blades.

19. In a rotor for helicopters and the like, the combination comprising:
(a) a hub rotatable about a central axis,
(b) said hub having a lateral extension,
(c) a sustaining blade,
(d) structure connecting said blade to said hub extension at a location off-set from said hub axis,
(e) said connecting structure including:
 (i) a member on the root end of said blade,
 (ii) means forming a pivot mounting between said member and hub extension,
 (iii) said pivot forming means establishing a pitch change axis,
(f) a flexible, axially non-extensible tension link member on each side of said hub for sustaining centrifugal forces deriving from said blade,
(g) said link members being sufficiently flexible to twist about their longitudinal axes during collective pitch change movement of said blade,
(h) structure operatively connecting corresponding ends of said link members to said blade and the ends opposite said corresponding ends to another part of said rotor,
(i) one of said connecting structures including resiliently flexible material interposed between the associated member and the portion of the rotor to which the member is connected,
(j) said material being compressible during collective pitch change movement to permit movement of the associated member relative to said hub axis, and,
(k) control structure operatively connected to said blade for causing collective pitch change movement thereof.

20. An articulated rotor for helicopters and the like comprising a hub rotatable about a central axis, at least two sustantaining blades, a flapping axis shaft secured to the root end of each blade, a central, torsionally resilient flexible bushing on each shaft between its ends, said bushings being carried by said hub at a distance from said central axis, said bushings forming universal pivot mountings for said shafts whereby each shaft effectively pivots about a vertical lead-lag axis passing approximately midway between the ends of the shaft and lying in a plane parallel to said central axis and whereby each shaft is rotatable in pitch change movement about a horizontal axis passing approximately through the center of the associated bushing, flight control means connected adjacent the leading ends of said shafts, and means associated with said shafts to carry the centrifugal forces deriving from said blades.

21. The rotor as claimed in claim 20 wherein said means asociated with said shafts comprise resiliently flexible end bushings on each shaft near its ends and spaced from said central bushing, and axially non-extensible, flexible links directly connected between corresponding end bushings of said shafts, said links being disposed on opposite sides of said hub so as to transmit reactive forces from one blade to the other.

22. A rotor for helicopters and the like comprising a hub rotatable about a central axis, a sustaining blade, means forming a lateral hub extension, a member secured to said blade, a resilient flexible bushing secured between said member and said hub extension against relative sliding movement, said bushing providing a flexural pivot which accommodates blade articulation through deformation of said bushing, and a flexible link connected to said member and another part of said rotor so as to sustain the centrifugal forces deriving from said blade.

23. A rotor for helicopters and the like comprising a hub rotatable about a central axis, means forming a lateral hub extension, a sustaining blade, and means mounting said blade on said hub extension, said blade mounting means including first structure defining generally hemispherical surfaces, second structure defining a pair of generally cup-shaped members, each of said cup-shaped members being mounted over one of said hemispherical surfaces, deformable resiliently flexible bushings secured between said members and said surfaces against relative sliding movement, said bushings providing flexural pivots which accommodate blade articulation through deformation of said bushings, a blade mounting member attached to the root end of said blade, means securing one of said structures to said hub extension and the other of said structures to said blade mounting member, and flight control means operatively connected to said blade.

24. A helicopter comprising in combination a fuselage, a mast in the form of a flexible shaft anchored to said fuselage, said shaft having an upper, elongated cantilever portion, a rotor support housing on the upper end of said shaft portion, a hub bearinged in said housing, an engine mounted on said fuselage near the bottom of said mast, drive means operatively connecting said engine to said hub, blade mounting means carried by said hub, said blade mounting means including torsionally resilient flexible bushings spaced from the axis of rotation of said hub, a blade connected to said hub through each bushing, said bushings providing universal pivot mountings for said blades, and flight control means carried by said hub and connected to said blade mounting means.

25. The helicopter as claimed in claim 24 wherein said flight control means comprises a vertically adjustable control sleeve mounted for rotation with said hub, a collar bearinged in said sleeve, a cyclic pitch control rod extending within said hub through said collar and said sleeve, means mounting said rod on said sleeve for angular control positioning of said rod with respect to the axis of said sleeve, arms extending from the upper end of such rod, said arms being provided with terminal masses so as to form a gyroscopic stabilizer bar, drop links connecting said arms to leading portions of said blade mounting means so that control positioning of said rod positions said arms for rotation in an inclined plane and produces cyclic pitch change movement of said blades, a pivot link connecting one arm to said hub so as to maintain said arms in predetermined angular relation with respect to the plane of rotation of said blades, and vertically actuatable collective pitch control means extending within said hub and connected to said collar, said collective pitch control means being movable axially of said hub to effect vertical adjustment of said sleeve and collective pitch change movement of said blades.

References Cited by the Examiner

UNITED STATES PATENTS

| | | | |
|---|---|---|---|
| 2,318,259 | 5/1943 | Sikorsky | 244—17.19 |
| 2,481,749 | 9/1949 | Hiller | 244—17.19 |
| 2,818,226 | 12/1957 | Hiller et al. | 244—17.27 X |
| 2,827,251 | 3/1958 | Doman | 244—17.11 |
| 2,949,967 | 8/1960 | Jovanovich | 170—160.53 |
| 2,960,163 | 11/1960 | Emmerson et al. | 170—160.13 |
| 3,029,048 | 4/1962 | Brooks et al. | 244—17.19 |
| 3,112,088 | 11/1963 | Speechley | 244—17.19 |
| 3,153,521 | 10/1964 | Laufer et al. | 244—17.11 |

FOREIGN PATENTS

| | | |
|---|---|---|
| 32,011 | 3/1927 | France. |
| 752,220 | 7/1956 | Great Britain. |

MILTON BUCHLER, *Primary Examiner.*

L. C. HALL, *Assistant Examiner.*